United States Patent Office 3,236,791
Patented Feb. 22, 1966

3,236,791
POLYURETHANE FOAMS
Eugene F. Cox and Fritz Hostettler, Charleston, W. Va., assignors to Union Carbide Corporation, a corporation of New York
No Drawing. Original application Dec. 29, 1961, Ser. No. 163,020. Divided and this application Mar. 12, 1965, Ser. No. 439,480
3 Claims. (Cl. 260—2.5)

This application is a divisional of application Serial No. 163,020, filed December 29, 1961, in the names of E. F. Cox and F. Hostettler.

This invention relates to novel polyols prepared from diaminotricyclodecane. In a particular aspect, this invention relates to alkylene oxide addition products of 3,10-diaminotricyclo[5.2.1.0$^{2,6}$]decane, and their application in the preparation of polyurethane foams.

It is well known that polyurethane foams may be prepared from polyisocyanates and polyethers such as the oxyalkylene derivatives of diols, triols and higher polyols. Furthermore it is known to prepare polyurethane foams with improved physical properties by the use of polyethers containing tertiary amino moieties such as triethanolamine, triisopropanolamine and oxyalkylene derivaties of polyamines such as ethylenediamine and diethylenetriamine.

It is a main object of the present invention to prepare polyurethane foams with still further improvement in physical properties.

In accordance with the present invention it has been found that polyols prepared by the oxyalkylation of certain tricyclic diamines can be converted by techniques known in the art into polyurethane foams with mechanical and dimensional properties superior to the same properties of foams prepared from conventional oxyalkylated amines.

The polyol compounds of the present invention are characterized by the formula:

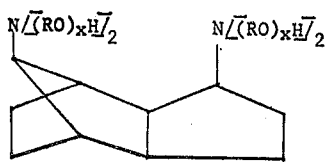

wherein R is an alkylene radical containing between one and four carbon atoms such as ethylene, propylene, 1,2-butylene, and the like, and mixtures thereof; and $x$ is a number having a value of at least one.

The compounds defined by the structural formula are obtained by the reaction of 3,10-diaminotricyclo

[5.2.1.0$^{2,6}$]

decane with alkylene oxide. The resulting products are tertiary amino polyols which are structurally characterized by the presence of hydroxyl-terminated chains of alkylene radicals substituted or unsubstituted which are connected to other alkylene radicals by means of recurring divalent oxy groups. The amino polyols of the present invention are useful as plasticizers in various synthetic and cellulosic materials, as textile assistants, lubricants, and the like. Because of their polyfunctional nature and branched-chain configuration the compounds are eminently suited as intermediates in the preparation of coatings and foams.

The reaction of alkylene axide with 3,10-diaminotricyclo[5.2.1.0$^{2,6}$]decane is conducted in the presence of a small amount of catalyst by adding the alkylene oxide, preferably a 1,2-alkylene oxide selected from the group consisting of ethylene oxide, propylene oxide, 1,2-butylene oxide or mixtures thereof, to the polyamine material which is preferably stirred an heated. If desired, the polyamine can be slurried in an inert solvent, e.g., toluene, xylene or other suitable hydrocarbon solvent, and then reacted with alkylene oxide. The reaction is carried out under atmospheric or superatmospheric pressure at temperatures of about 60° C. to 180° C. To the extent required any conventional heat transfer means can be used to remove the exothermic heat of reaction. The products of the reaction are generally mixtures which can be utilized as such for their intended purpose or further refined to obtain a more purified product.

The amount of alkylene oxide to be reacted with the polyamine is determined by the average molecular weight of the product desired. For the new reaction products described herein which have utility as intermediates in the preparation of foams, the molecular weights, based on the hydroxyl value, can range from about 400 to 10,000 or more. To obtain such products having the desired molecular weights the polyamine starting materials are treated with the 1,2-alkylene oxide until each adduct represented in the above general formula by R contains at least one mole of alkylene oxide. Within these limits, of course, the addition of alkylene oxide to each amino group can be balanced or unbalanced i.e., each can contain approximately the same or different average number of alkylene oxide groups per chain. For high molecular weight products the total moles of alkylene oxide reacted with each amino hydrogen group can range from one to about thirty moles or more.

The time required for completion of the alkylene oxide addition will vary. In general, a longer time of alkylene oxide addition is required for products of high molecular weight whereas with a low molecular weight product the reaction is faster and the addition time is short. Additionally, at lower temperatures than those above described, the alkylene oxide addition for high molecular weight products, e.g., 10,000 or more, may require an impractical amount of time such as several weeks. For the products hereinafter prepared, the time required for alkylene oxide addition ranged from about two hours to several days.

In carrying out the alkylene oxide reaction any of the known catalysts for this type of addition reaction can be employed. The preferred catalysts are alkaline catalysts, e.g., alkali metal catalysts such as sodium hydroxide, potassium hydroxide and potassium t-butoxide. Tertiary amines may also be employed as catalysts. The amount of catalyst employed can be in the range of 0.002 to 2.0 percent by weight, based on the total amount of reactants, including the alkylene oxide or mixtures thereof appearing in the reaction product. An amount of active catalyst within this range is not so large as to cause difficulty in removal of catalyst or introduction of excess inorganics in the final product and good results have been obtained with about 0.01 to 0.5 percent by weight, based on the total reactants, of potassium hydroxide. All of the catalyst need not be added at the start of the reaction. If desired, a suitable amount can be initially added and the remainder of the catalyst added from time to time throughout the course of the reaction to maintain a substantially constant catalyst concentration.

As above mentioned, the molecular weights of the new compounds depend upon the amount of alkylene oxide utilized in the reaction. The average molecular weight and reactivity of the amino polyols prepared herein can be determined readily by analysis for hydroxyl content. The hydroxyl number is a measure of and is proportional to the hydroxyl concentration per unit weight. The hydroxyl number is defined in terms of milligrams of KOH equivalent per gram of alkylene oxide-polyamine reaction product and is determined by reacting acetic anhydride (in pyridine solution) at refluxing temperature with the hydroxyl groups of the reaction product. The unreacted anhydride and acetic acid formed are titrated with standard base using phenolphthalein as an indicator. The molecular weight can be readily calculated from the hydroxyl number by the formula:

$$\text{Molecular weight} = \frac{\text{Functionality} \times 1000 \times 56.1}{\text{Hydroxyl number}}$$

The 3,10-diaminotricyclo[5.2.1.0$^{2,6}$]decane starting material is conveniently prepared by the hydrogenation of 1,8 - dioximino - 4,7-methano-3a,4,7,7a-tetrahydroindene. The indene employed in the hydrogenation is a known compound which can be prepared from cyclopentadiene, nitrosyl chloride and sodium methoxide. The hydrogenation reaction should be conducted in the presence of from one to two hundred fifty moles of anhydrous ammonia per mole of dioxime, and preferably is conducted using from about five to about fifty moles of anhydrous ammonia per mole of dioxime. The hydrogenation is conveniently conducted at a temperature of from about 25° C. to about 200° C. and at a pressure of about 1000 to about 2000 p.s.i.g. Optimum results are obtained when a hydrogenation catalyst is employed such as Raney nickel, cobalt, platinum, palladium, and the like.

The 3,10 - diaminotricyclo[5.2.1.0$^{2,6}$]decane produced also contains amines of higher functionality such as represented by the following structure:

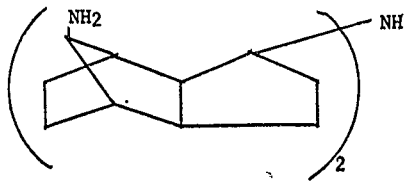

The presence of the higher functional amines in the 3,10-diaminotricyclo[5.2.1.0$^{2,6}$]decane is not deleterious in most uses, particularly in the production of polyurethane foams.

In the preparation of polyurethane foams by the reaction of an organic polyisocyanate with the amino polyols of the present invention the foaming operation can be carried out continuously or batchwise employing the one-shot, semiprepolymer or prepolymer techniques. The preferred procedure is the semiprepolymer technique wherein the amino polyol polyether reactant is partially extended with excess polyisocyanate to provide a reaction product containing a high percentage of free isocyanato groups (25 percent to 35 percent) which is foamed at a later stage by reaction with additional polyether catalyst and a blowing agent. The amount of isocyanate employed will depend upon the density of the urethane foam and the amount of crosslinking desired. In general, the total isocyanato equivalent to total active hydrogen equivalent including water should be such so as to provide a ratio of 0.8 to 1.2 equivalents of isocyanato group per equivalent of active hydrogen, and preferably a ratio of about 0.9 to 1.1 equivalents.

A variety of organic isocyanates can be employed for reaction with the polyethers above described to provide urethane foams which can be prepared according to the invention. Preferred isocyanates are polyisocyanates and polyisothiocyanates of the general formula.

$$R(NCG)_x$$

wherein G is oxygen or sulfur, $x$ is an integer of two or more and R is an alkylene, substituted alkylene, arylene or substituted arylene radical, a hydrocarbon or substituted carbon containing one or more aryl —NCG bonds and one or more alkyl —NCG bonds. R can also include radicals such as —RZR— where Z can be a divalent moiety such as —O—, —O—R—O—, —CO—, —CO$_2$—, —S—, —S—R—S—, —SO$_2$—, and the like. Examples of such compounds include hexamethylene diisocyanate, 1,8 - diisocyanato - p - methane xylylene diisocyanates, (OCNCH$_2$CH$_2$CH$_2$OCH$_2$)$_2$, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4''-triisocyanate, xylene-α,α'-diisothiocyanate, and isopropylbenzene-α,4-diisocyanate.

Further included are dimers and trimers of isocyanates and diisocyanates and polymeric diisocyanates of the general formula:

$$(RNCG)_x$$

and $$[R(NCG)_x]_y$$

in which $x$ and $y$ are two or more, as well as compounds of the general formula:

$$M(NCG)_x$$

in which $x$ is two or more and M is a monofunctional or polyfunctional atom or group. Examples of this type include ethylphosphonic diisocyanate, C$_2$H$_5$P(O)(NCO)$_2$; phenylphosphonic diisocyanate, C$_6$H$_5$P(NCO)$_2$; compounds containing a ≡Si—NCG group, isocyanates derived from sulfonamides, R(SO$_2$NCO)$_x$, and the like.

A particularly useful mixture of polyisocyanates are the products obtainable by phosgenation of the reaction products of aniline and formaldehyde as expressed by the following general formula:

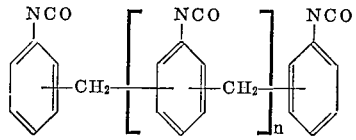

wherein $n=0$ to 3.

The foaming operation is preferably effected by liquefied fluorocarbon gases which have boiling points below about 80° F. and above —60° F. The liquefied gases are saturated aliphatic hydrocarbons which vaporize at or below the temperature of the foaming mass. Such gases are at least partially fluorinated and may also be otherwise halogenated.

Preferred blowing agents are the fluorocarbons such as trichloromonofluoremethane; dichlorodifluoromethane, dichlorofluoromethane, 1,1 - dichloro - 1 - fluoroethane; 1-chloro-1,-difluoro - 2,2 - dichloroethane; and 2-chloro-1,1,1,2,3,3,4,4,4-nonafluorobutane. The amount of blowing agent used will vary with density desired in the foaming product. In general it may be stated that for 100 grams of resin mix containing an average NCO/OH ratio of 1 to 1, about 0.005 to 0.3 mole of gas is used to provide densities ranging from 30 to 1 pounds per cubic foot. If desired, water can be used in conjunction with the fluorocarbon.

Catalysts that are suitable for accelerating the polyether-isocyanate reaction include a wide variety of organic tin catalysts, tertiary amine catalysts and combinations thereof.

Among the organic tin compounds that deserve particular mention are stannous acylates such as stannous acetate, stannous octoate, stannous laurate, stannous oleate, and the like; stannous alkoxides such as stannous butoxide, stannous 2-ethylhexoxide, stannous phenoxide, o-, m- and p-stannous cresoxides, and the like; dialkyl tin salts of carboxylic acids, e.g., dibutyltin diacetate, dibutyltin dilaurate, dibutyltin maleate, dilauryltin diacetate, dioctyltin diacetate, and the like. Similarly, there can be used a trialkyltin hydroxide, dialkyltin oxide or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin dichloride, dioctyltin dichloride, and the like.

Typical tertiary amine catalysts which can be employed include trimethylamine, N-methylmorpholine, N-ethylmorpholine, triethylenediamine, N,N,N',N'-tetramethyl-1,3-butanediamine, triethanolamine, and the like. The tertiary amines can be used as primary catalysts for accelerating the polyether-isocyanate reaction or as a secondary catalyst in combination with the above-noted organic tin compounds.

It is also within the scope of the invention to employ small amounts, e.g., about 0.001 percent to 5.0 percent by weight, based on the total ingredients, of an emulsifying agent such as a siloxane-oxyalkylene copolymer having from about 10 to 80 percent by weight of siloxane polymer and from 90 to 20 percent by weight of alkylene oxide polymer, such as the copolymers described in United States Patent No. 2,834,748. Although the use of an emulsifier is desirable to influence the type of foam structure that is formed, the foam products of the invention can be prepared without emulsifiers.

In addition to the above-described amino polyols, it is also within the scope of the invention to blend varying amounts of polyfunctional compounds with the polyethers before reaction with isocyanates. Such compounds include, among others, alkylene glycols such as ethylene glycol, diethylene glycol, triethylene glycol, tetraethylene glycol and the corresponding propylene homologs such as propylene glycol, dipropylene glycol, and the like; saturated aliphatic polyols such as glycerol, 1,2,4-butanetiol, 1,2,6 - hexanetriol, trimethylolpropane, sorbitol, pentaerythritol, and the like; acyclic amines such as triethanolamine, triisopropanolamine, and the like. Further included are the ethylene, propylene and butylene oxide addition products of the above-noted aliphatic polyols and amines which have hydroxyl numbers in the range of about 300 to 750. Also included are the alkylene oxide adducts of acyclic polyamines such as ethylenediamine, diethylenetriamine, triethylenetetramine, and the like. When admixed with the amino polyols, this modification has the advantage of further diversifying the combinations of characteristics obtainable in the ultimate foam product by increasing the number of available crosslinking sites.

Rigid polyurethane foams prepared according to the present invention have superior properties to similar foams presently known and used in the art. The rigid polyurethane foams of the present invention exhibit considerable improvement in dimensional stability at elevated temperatures and under humid aging conditions. It is believed that the superiority of the present invention foams is partly attributable to the rigid tricyclo ring structure contained in the invention amino polyols.

The following examples will serve to illustrate specific embodiments of the invention.

RIGID FOAM TEST METHODS

Sample conditioning and preparation

Foam blocks submitted for testing are shelved for a minimum of three days prior to cutting, with the intention of insuring representative cure of the polymer.

Specimens are cut from samples on band saws, with which smooth cuts and proper dimensions can be obtained. Each specimen is carefully identified by a suitable marking system.

Density

Density, by definition, is pounds per cubic foot (p.c.f.) of foamed material.

Equipment includes a thickness gage (exerting 0.025 p.s.i. pressure on the foam) and an analytical balance.

Skin-free, two-inch cubes are tested in accordance with SPI and ASTM D1622. Each dimension is measured to 0.01 inch and each specimen is weighed to 0.01 gram. Density is calculated from these values to 0.01 p.c.f. for each specimen, but is averaged to the closest 0.01 p.c.f. for the overall sample from which the specimens were taken. Larger specimens are used where required by subsequent tests while these cubical specimens are used for other tests as indicated below.

Commpressive strength

Mechanical properties are represented by the easily measured compressive yield strengths of products. Since foams are normally orthotropic, strengths are regularly measured both parallel and perpendicular to the "grain" or direction of rise. Strengths are measured at room and elevated temperatures.

The apparatus consists of a standard floor-model Instron testing machine with accessories, a forced-circulation cabinet which maintains desired temperatures at the machine's working area, a pair of metal stirrups to transmit forces from the Instron to the cabinet interior, and a forced-draft oven for preconditioning specimens at selected temperatures.

The skin-free two-inch cubes described previously are processed in a method based on SPI and ASTM D1621. The specimen is placed between the parallel loading plates of the Instron. As these plates approach each other (0.2 inch per minute) load and deflection are recorded automatically. Compressive strength is calculated as the maximum pounds per square inch (p.s.i.) of stress occurring below an indicated strain of 10 percent. Individual results are determined to the closest of 0.1 p.s.i. but are averaged to whole values during analysis.

At room temperature (23° C.) specimens merely rest overnight in the air-conditioned test lab. At 85° C. specimens are preheated for at least one hour. The cabinet on the machine prevents cooling of specimens during testing.

Dimensional stability

Most uses of rigid foams require that their service life extend over a number of years. Products must therefore resist changes during aging in many possible environments. A number of accelerated tests may be employed as a check on durability and the condition selected is 70° C. and nearly 100 percent relative humidity for four weeks (humid aged).

The apparatus includes a suitably controlled environmental test chamber, thickness gages and a water displacement apparatus for determining induced volume changes, the compressive strength equipment, and an analytical balance. The last is used in conjunction with the displacement cup.

Specimens of known volume are placed in the chamber. They are removed after one, two and four weeks. Where the faces of specimens remain flat, average dimensions are measured on the dial indicator. Where faces warp, the weight of water displaced by aged specimens is measured. In either case, the new specimen volume is computed and "percent increase in volume" is calculated by comparison with the original value.

The diamine and water were charged to a two-liter reaction flask equipped with a Dry Ice condenser, dropping funnel, mechanical stirrer, thermometer, and nitrogen inlet tube. The reaction medium was heated to 140° C. and 713 grams of propylene oxide were added over a six and one-half hour period. This was followed by the addition of 2 grams of potassium hydroxide, and 714 grams more of propylene oxide were introduced over a ten and one-half hour period. The product mixture was diluted with isopropyl alcohol and the potassium hydroxide was removed with Amberlite [1] IR-120. The diluent was then stripped to a pot temperature of 150° C. at a pressure of 5 millimeters of mercury. The residual amino polyol adduct product had a hydroxyl number of 349.

EXAMPLE 3

A polyol was prepared by the addition of 337 grams of propylene oxide over a five-hour period at 100° C. to

EXAMPLE 1

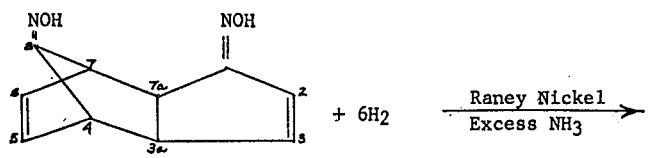

1,8-dioximino-4,7-methano-3a,4,7,7a-tetrahydroindene $+ 6H_2$ $\xrightarrow{\text{Raney Nickel}}_{\text{Excess NH}_3}$

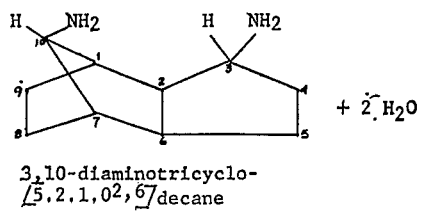

3,10-diaminotricyclo-[5.2.1.0$^{2,6}$]decane $+ 2 H_2O$

A mixture of 64.3 grams (0.338 mole) of 1,8-dioximino-4,7-methano-3a,4,7,7a-tetrahydroindene, 250 grams of Raney nickel catalyst and 1500 milliliters of ethanol was divided equally between two three-liter stainless steel rocker autoclaves. To each autoclave was then added 689 grams of anhydrous ammonia (40.5 moles). Thus the molar ratio of ammonia to dioximine was 240 to 1. Each charge was then hydrogenated at 1000 to 1600 p.s.i.g. to a maximum temperature of 90° C. The hydrogen absorption appeared to be complete after two hours at 27° C., but the temperature was gradually increased to 90° C. over a period of six hours to ensure complete hydrogenation. The hydrogenated mixtures were combined, filtered to remove catalyst and distilled to isolate 41 grams of 3,10-diaminotricyclo[5.2.1.0$^{2,6}$]decane as a colorless liquid having these properties: boiling range 87° C. to 98° C./0.5 mm., 84.2 equivalent weight as amine by titration with perchloric acid. Since the theoretical equivalent weight for the diamine is 83, the purity was 98.6 percent. The yield was 72 percent based on the dioxime. The distillation residue weighed only 4.8 grams and the ratio of distilled product to residue was 8.5.

EXAMPLE 2

The propylene oxide adduct of 3,10-diaminotricyclo-[5.2.1.0$^{2,6}$]decane was prepared employing the following charge:

| | |
|---|---|
| 3,10-diaminotricyclo[5.2.1.0$^{2,6}$]decane ___grams__ | 514 |
| Distilled water _____milliliter__ | 1 |
| Potassium hydroxide _____grams__ | 2 |
| Propylene oxide _____do____ | 1427 |

140° C. to a mixture of 200 grams of 3,10-diaminotricyclo[5.2.1.0$^{2,6}$]decane (Example 1) and one milliliter of water. After heating for seventy minutes at 125° C. to 138° C. to complete the reaction and to remove any unreacted propylene oxide, the adduct had a hydroxyl number of 558.

EXAMPLE 4

A rigid polyurethane foam was prepared employing tricyclodecane polyol.

To a one-liter polyethylene bottle was charged: 250 grams of polyether prepared by the addition of propylene oxide to a phenol-acrolein condensation product (hydroxyl number 256.5), 250 grams of the tridecylene diamine propylene oxide adduct (hydroxyl number 349) prepared in Example 2, and 114 grams of trichloromonofluoromethane.

The bottle was warmed at a temperature of 55° C. for one-half hour with shaking, and then placed on rollers overnight to effect homogeneity.

172 grams of the mixture was charged to a 500 milliliter stainless steel beaker. 1.2 grams of silicone oil surfactant (siloxane-oxyalkylene copolymer) and 0.2 gram of dibutyltin dilaurate were blended into the mixture and then 72.3 grams of toluene diisocyanate was stirred in vigorously and the resulting creamy mixture was poured into a preheated mold (70° C.). The foam product which formed was cured in a circulating oven for ten minutes at a temperature of 70° C. The cured foam was not friable and had a density of 2.2 pounds per cubic foot.

[1] Nuclear sulfonic acid cation exchange resin; Rohm & Haas Company.

EXAMPLE 5

*Prepolymer.*—A quasi-prepolymer was prepared by the addition of 1145 grams of an 80:20 mixture of 2,4- and 2,6-tolylene diisocyanate to 400 grams of polyether prepared by the addition of propylene oxide to a phenol-acrolein condensation product (hydroxyl number 249), over a two-hour period at 75° C. The prepolymer contained a calculated free tolylene diisocyanate content of 63.3 percent.

*Foam.*—To a polyethylene bottle was charged 800 grams of a polyether (above) prepared by the addition of propylene oxide to a phenol-acrolein condensation product (hydroxyl number 249), 200 grams of the amino polyol prepared in Example 3, and 320 grams of trichloromonofluoromethane. A homogeneous solution was obtained as described in Example 4.

132 grams of this solution was charged to a 500 milliliter stainless steel beaker, followed by the addition of 1.2 grams of silicone oil surfactant (siloxane-oxyalkylene copolymer) and 0.3 gram of dibutyltin dilaurate. The mixture was blended and 80.2 grams of the prepolymer described above was stirred in vigorously and the resulting creamy mixture was poured into a preheated mold (70° C.). The foam product which formed was cured in a circulating air oven for ten minutes at 70° C. The cured foam had a density of 1.92 pounds per cubic foot.

EXAMPLE 6

A rigid polyurethane foam was prepared by the "one-shot" procedure. In a manner described in Example 5, a mixture of 835 grams of the propylene oxide adduct of a phenol-acrolein condensation product (hydroxyl number 249), 165 grams of the propylene oxide adduct of 3,10 - diaminotricyclo[5.2.1.0$^{2,6}$]decane described in Example 3, and 214 grams of trichloromonofluoromethane was blended to a homogeneous solution.

To 170 grams of this solution was added 1.2 grams of a silicone oil surfactant (siloxane-oxyalkylene copolymer) and 0.3 gram of dibutyltin dilaurate. After this mixture was blended, 68.4 grams of an 80:20 mixture of 2,4- and 2,6-tolylene diisocyanate was stirred in vigorously and the resulting creamy mixture was poured into a preheated mold at 70° C. The foam product which formed was cured in a circulating oven for ten minutes at 70° C. The cured foam had a density of 2.14 pounds per cubic foot.

*Physical properties of foams*

| Property | Foam | | | |
|---|---|---|---|---|
| | Example 5 | | Example 6 | |
| Density, pounds per cubic foot | 1.92 | a 1.55 | 2.14 | b 1.83 |
| Compressive strength, p.s.i.: | | | | |
| Parallel to direction of rise: | | | | |
| 23° | 33.6 | 27.4 | 44.0 | 34.9 |
| 85° | 30.3 | 25.8 | 32.6 | 28.8 |
| Perpendicular to direction of rise: | | | | |
| 23° | 11.7 | 6.4 | 14.7 | 11.5 |
| 85° | 12.6 | 7.8 | 15.6 | 12.1 |
| Dimensional stability, percent change in volume after aging at 70° C. and 100 percent relative humidity: | | | | |
| One week | 11 | 18 | 7 | 8 |
| Two weeks | 9 | 21 | 8 | 9 |
| Four weeks | 9 | 25 | 10 | 11 | a Same formulation as Example 5, but additional trichloromonofluoromethane used.
b Same formulation as Example 6, but additional trichloromonofluoromethane used.

What is claimed is:

1. A process for preparing a cellular foam which comprises catalytically reacting a polyether polyol and a polyisocyanate in the presence of a blowing agent, said polyether polyol having the formula:

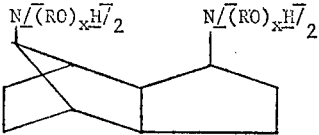

wherein R is a 1,2-alkylene radical from the groups consisting of 1,2-ethylene, 1,2-propylene, 1,2-butylene and mixtures thereof; and $x$ has a value sufficient to provide a molecular weight, based on hydroxyl number of said polyol, of from about 400 to about 10,000.

2. The method of claim 1 wherein said blowing agent is trichloromonofluoromethane.

3. The foam product produced by the method of claim 1.

No references cited.

LEON J. BERCOVITZ, *Primary Examiner.*